(No Model.) 2 Sheets—Sheet 1.
S. H. COCHRAN.
CHURN OR MIXER FOR USE IN THE MANUFACTURE OF ARTIFICIAL BUTTER.
No. 285,974. Patented Oct. 2, 1883.
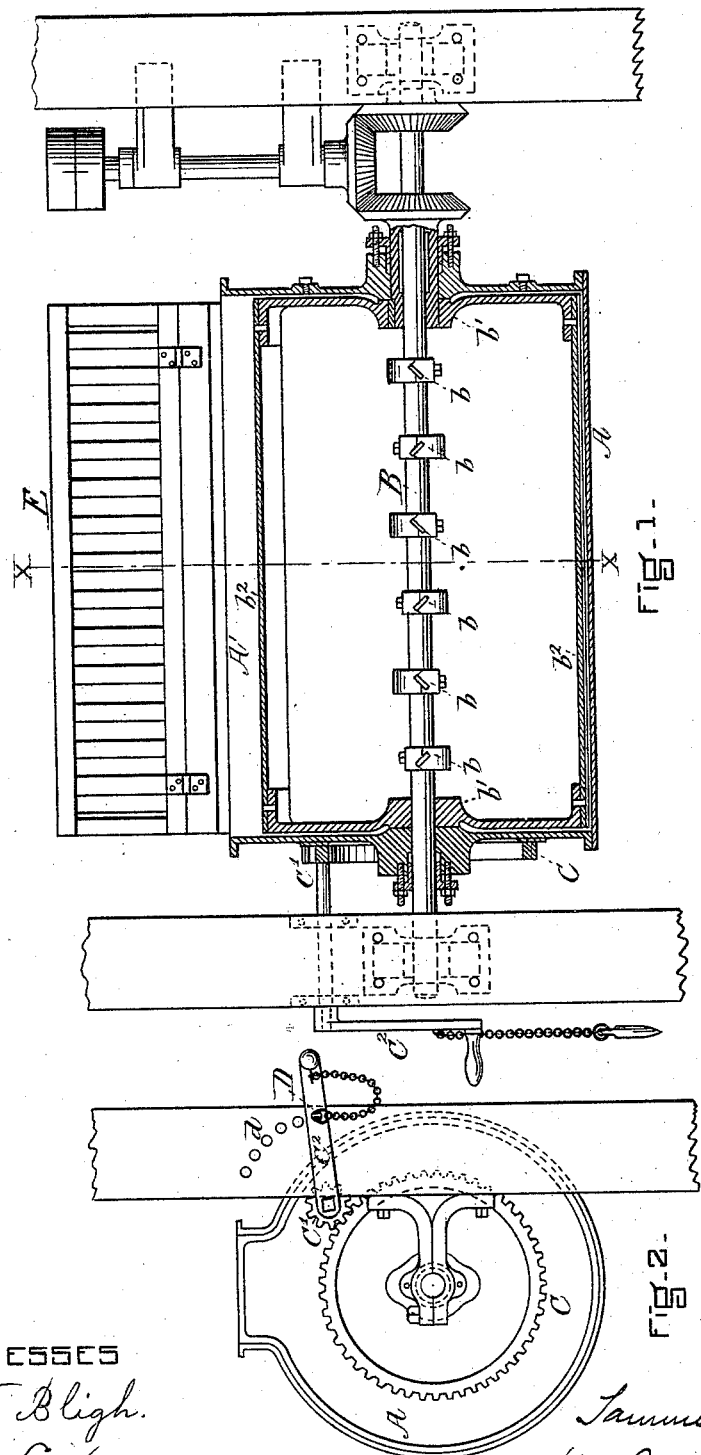
WITNESSES
J. F. Bligh.
M. J. Lowe.
INVENTOR
Samuel H. Cochran
by Geo. O. G. Coale
his Attorney

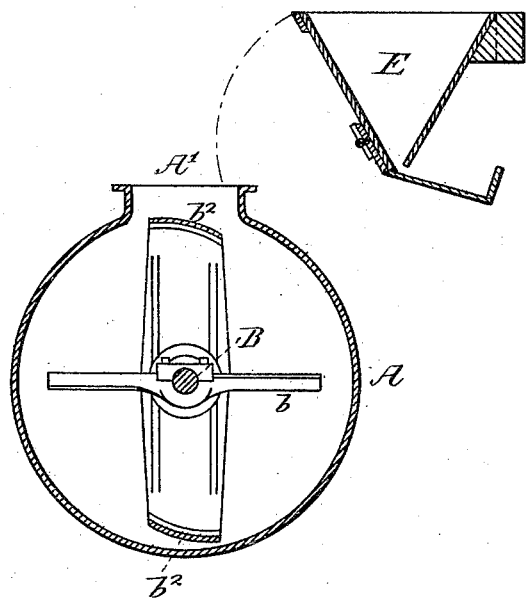

UNITED STATES PATENT OFFICE.

SAMUEL H. COCHRAN, OF EVERETT, MASSACHUSETTS.

CHURN OR MIXER FOR USE IN THE MANUFACTURE OF ARTIFICIAL BUTTER.

SPECIFICATION forming part of Letters Patent No. 285,974, dated October 2, 1883.

Application filed June 15, 1883. (No model.)

*To all whom it may concern:*

Be it known that I, SAMUEL H. COCHRAN, of Everett, in the county of Middlesex and State of Massachusetts, a citizen of the United States, have invented certain new and useful Improvements in Churns or Mixers for Use in the Manufacture of Artificial Butter, of which the following is a specification.

My invention relates to that class of churns which may be known as "horizontal churns"—*i. e.*, churns having a horizontal float-shaft; and it consists, chiefly, in such a churn adapted to be rotated about a horizontal axis, so that its contents may be easily examined, or so that it may be thrown over when it is desired to empty it.

My invention also consists in certain details of construction, all fully described below.

In the drawings, Figure 1 is a longitudinal section of a churn, showing my invention; and Fig. 2, an end elevation, the ice-box shown in Fig. 1 being omitted. Fig. 3 is a cross-section on line $x\ x$, Fig. 1.

A is the outer wall of a churn. It is provided with an opening, A', at the top, for the purpose of introducing the material to be churned.

B is a shaft upon which the churn is hung. This shaft is suitably hung, and is provided with floats $b$, and also with two sleeves, $b'$, to which are attached a pair of floats, $b^2$, of peculiar construction. These floats $b^2$ may be called "scoop floats" on account of their shape, (see Fig. 3) and their function, which is not only to assist in beating up or churning the butter, but also to scoop it and throw it from the sides and toward the center of the churn. The best form of this float is that shown in the drawings; but so long as the angle of this float with the wall of the churn from which it is to throw the material being churned is not approximately a right angle, its purpose will be served. When both sets of floats, $b$ and $b'$, are used, they should be rotated in opposite directions in some such way as is shown. The shaft should be suitably packed where it enters the churn. The churn should be locked in some convenient way to prevent its overturning while in use. When the churn is very large, it is best provided with some easily-controlled means for rotating it. I have shown in the drawings a simple means, consisting of a gear, C, attached to the churn about its axis as a center, and a pinion, C', geared into it and operated by a suitable crank, C². By turning this crank the churn may be thrown over part way, so as to examine its contents; or it may be thrown entirely over, so as to empty it. D is a hole in the crank, and $d\ d$ a series of holes in the beam from which the crank is hung. By means of these holes and a suitable pin, the crank, and consequently the churn, may be locked in any desired position.

It is often desirable to use ice in a churn of this kind for the purpose of hardening the newly-churned butter—as, for example, is described in an application made by me for Letters Patent of the United States for a process for making butter. In this case the ice-box may be conveniently made as shown at E in Figs. 1 and 3—*i. e.*, having a suitable draining-trough, and its front being adapted to let down and rest upon the mouth of the churn, so as to form a chute by which the ice can slide into the churn. This chute should be made of slats, or otherwise provided with means of draining, so that the melted ice shall not reach the churn.

The churn above described, and shown in the drawings, is adapted to be operated by steam, but by simple alterations it may be adapted for hand use, in which case, if the churn were small, but one set of floats would ordinarily be necessary. If desired, it may be hung upon independent pivots, instead of upon the shaft B, as described above.

What I claim as my invention is—

1. The horizontal mixer or churn above described, provided at each end with suitable means of pivotal support, and adapted to be rotated upon such pivotal supports about a horizontal axis, all as and for the purposes set forth.

2. The horizontal mixer or churn above described, provided at each end with suitable means of pivotal support, and provided with mechanism, substantially as above described, whereby it may be caused to rotate upon such pivotal supports about a horizontal axis, all as and for the purpose set forth.

3. The horizontal mixer or churn, above described, provided at each end with suitable means of pivotal support, and having mechanism, substantially as above described, whereby it may be caused to rotate about a horizontal axis, in combination with suitable locking mechanism adapted to prevent such rotary motion, all as and for the purposes set forth.

4. In combination, in a churn provided with suitable mixing-floats, the scoop-float above described, and adapted to be operated for the purposes set forth.

5. In combination, the churn A and ice-box E, arranged together as shown, the front of the ice-box being adapted to serve as a chute, whereby the ice may be guided into the churn, as set forth.

6. The ice-box above described, and provided with a hinged front and draining-trough, as and for the purposes set forth.

In testimony whereof I have hereunto subscribed my name.

SAMUEL H. COCHRAN.

Witnesses:
 J. F. BLIGH,
 GEORGE O. G. COALE.